(12) United States Patent
Imai et al.

(10) Patent No.: US 7,243,944 B2
(45) Date of Patent: Jul. 17, 2007

(54) ACTIVATING DEVICE FOR OCCUPANT PROTECTION DEVICE AND CONTROLLING METHOD THEREFOR

(75) Inventors: Katsuji Imai, Nagoya (JP); Yujiro Miyata, Toyota (JP); Motomi Iyoda, Seto (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 389 days.

(21) Appl. No.: 10/476,659

(22) PCT Filed: May 13, 2002

(86) PCT No.: PCT/IB02/01643

§ 371 (c)(1),
(2), (4) Date: Mar. 12, 2004

(87) PCT Pub. No.: WO02/092397

PCT Pub. Date: Nov. 21, 2002

(65) Prior Publication Data

US 2004/0148082 A1  Jul. 29, 2004

(30) Foreign Application Priority Data

May 14, 2001 (JP) .............................. 2001-143668

(51) Int. Cl.
*B60R 21/013* (2006.01)
(52) U.S. Cl. .................. 280/735; 180/274; 701/45
(58) Field of Classification Search ............... 280/735; 180/282, 271; 701/45
See application file for complete search history.

(56) References Cited

U.S. PATENT DOCUMENTS

| 5,083,276 | A | * | 1/1992 | Okano et al. | 701/46 |
|---|---|---|---|---|---|
| 5,166,880 | A | * | 11/1992 | Furui | 701/45 |
| 5,182,459 | A | * | 1/1993 | Okano et al. | 307/10.1 |
| 5,208,484 | A | * | 5/1993 | Okano et al. | 307/10.1 |
| 5,262,949 | A | * | 11/1993 | Okano et al. | 701/46 |
| 5,409,258 | A | * | 4/1995 | Kawabata | 280/735 |
| 5,673,932 | A | * | 10/1997 | Nitschke et al. | 280/735 |
| 6,170,864 | B1 | | 1/2001 | Fujita et al. | 280/735 |

(Continued)

FOREIGN PATENT DOCUMENTS

DE  199 36 819  9/2000

(Continued)

*Primary Examiner*—Paul N. Dickson
*Assistant Examiner*—Leonard McCreary, Jr.
(74) *Attorney, Agent, or Firm*—Kenyon & Kenyon LLP (57) ABSTRACT

The activating device (20) for an occupant protection device includes a first deceleration detecting means (22) for detecting a first deceleration G in vehicle front/rear direction and an activation judging means (37) for judging whether the activation of the occupant protection device is necessary or not by comparing the first deceleration G detected by the first deceleration detecting means (22) with a first threshold value. The device further includes a second deceleration detecting means (24, 26) for detecting a deceleration LG, RG at a position further front side of the vehicle than the position detecting the first deceleration, a collision condition detecting means (35) for detecting a vehicle collision condition based on a second threshold value by the deceleration LG and RG and a first threshold changing means (36) for changing the first threshold value of an activation judging means (37) based on the detected result of the collision condition detecting means (35).

28 Claims, 7 Drawing Sheets

U.S. PATENT DOCUMENTS

| | | | |
|---|---|---|---|
| 6,327,527 B1 * | 12/2001 | Imai et al. | 701/45 |
| 6,327,528 B1 * | 12/2001 | Vallette et al. | 701/45 |
| 6,330,500 B1 * | 12/2001 | Moriyama et al. | 701/45 |
| 6,371,515 B1 * | 4/2002 | Fujishima et al. | 280/735 |
| 6,424,899 B2 * | 7/2002 | Imai et al. | 701/45 |
| 6,600,984 B1 * | 7/2003 | Holzner et al. | 701/45 |
| 2002/0016658 A1 * | 2/2002 | Imai et al. | 701/45 |
| 2002/0169535 A1 * | 11/2002 | Imai et al. | 701/45 |

FOREIGN PATENT DOCUMENTS

| | | |
|---|---|---|
| EP | 1 026 052 | 9/2000 |
| JP | A 10-152014 | 6/1998 |
| JP | A 2000-296755 | 10/2000 |
| JP | A 2000-344046 | 12/2000 |
| JP | A 2001-30873 | 2/2001 |
| JP | A 2002-120689 | 4/2002 |
| JP | A 2002-178872 | 6/2002 |
| WO | WO 02/16170 | 2/2002 |

* cited by examiner

ACTIVATING DEVICE FOR OCCUPANT PROTECTION DEVICE AND CONTROLLING METHOD THEREFOR

This is a 371 of PCT/IB02/01643 FILED 13 May 2002, which claims priority to JP 2001-143668 filed 14 May 2001, the contents of which are incorporated herein by reference.

BACKGROUND OF THE INVENTION

1. Field of the Invention

This invention relates to an activating device for occupant protection device and the method for controlling the activating device. In more detail, the present invention relates to an activating device for an occupant protection device and a controlling method therefor by early stage and accurate activation by providing a front sensor provided in the vehicle front most portion for detecting a vehicle collision at an early stage and a floor sensor provided at the central portion of the vehicle.

2. Description of the Related Art

An occupant protection device such as an air bag installed in a vehicle adjusts the activating timing of the occupant protection device based on the time change of the vehicle deceleration detected by a deceleration sensor provided in the vehicle. In order to activate with a more proper timing, it is important for the occupant protection device to detect the vehicle collision without fail. The applicant of this invention has proposed one of such collision-detecting device that includes an activating device for the occupant protection device that includes a floor sensor provided at the center of the vehicle body and a front sensor arranged at the front of the vehicle to detect the vehicle deceleration. Based on the detected deceleration, the activating timing of the occupant protection device is controlled. (Japanese patent Laid-Open publication H10-152014). According to this activating device, the occupant protection device can be timely activated even under a vehicle collision, the impact of which could not be detected by a floor sensor only.

By the way, when the vehicle is under collision condition, an early stage the vehicle collision condition is detected by the front sensor. By arranging the front sensor at the vehicle front most portion where the impact of the collision is easily detected, the front sensor can detect the vehicle collision more sensibly and by using the detected value, the protecting device can be activated early and accurately.

Further, it is preferable for the activating device of the occupant protection device to be structured so that the front sensor arranged at the vehicle portion where the impact can be easily detected, can function without fail.

SUMMARY OF THE INVENTION

It is an object of the present invention to provide an activating method and an activating device for an occupant protection device which can early and accurately activate the occupant protection device.

In order to achieve the object, the activating device according to the present invention includes a first deceleration detecting means for detecting a deceleration in vehicle front/rear direction and an activation judging means for judging the activation of the occupant protection device by comparing the vehicle deceleration detected by the first deceleration detecting means with a predetermined first threshold value, characterized in that the device further includes a second deceleration detecting means arranged at a further front side of the vehicle relative to the first deceleration detecting device a collision condition detecting means for detecting the vehicle collision condition by comparing the deceleration detected by the second deceleration detecting means with a predetermined second threshold value and a first threshold value deciding portion for deciding the first threshold value of the activation judging means for judging the activation of the occupant protecting device based on the detected result of the collision condition detecting means.

The activation device for occupant protecting device further includes an integral calculating means for integrating the vehicle deceleration speed by the time and further includes offset portion to avoid the wave which is not the subject of for detecting the collision condition.

The method for controlling the activation of the occupant protection device is characterized in that the method includes the steps of detecting the vehicle collision condition by comparing the deceleration detected at a vehicle front side further front relative to the position where the vehicle deceleration was detected and changing the first threshold value of the activation judging means for judging the activation of the occupant protection device based on the detected vehicle collision condition.

Further, according to the activating device for occupant protection device and controlling the method therefor, upon vehicle collision, the activation judging means is operated to properly activate the occupant protection device for protecting an occupant of the vehicle by using the first threshold value decided based on the deceleration detected by the second deceleration detecting means provided at the vehicle front most portion where a highly sensible detection is possible. Further, the activating judging means can be operated to operate the occupant protection device in an operating state appropriate to the vehicle collision type.

DETAILED DESCRIPTION OF THE PREFERRED EMBODIMENTS

Figure 1:
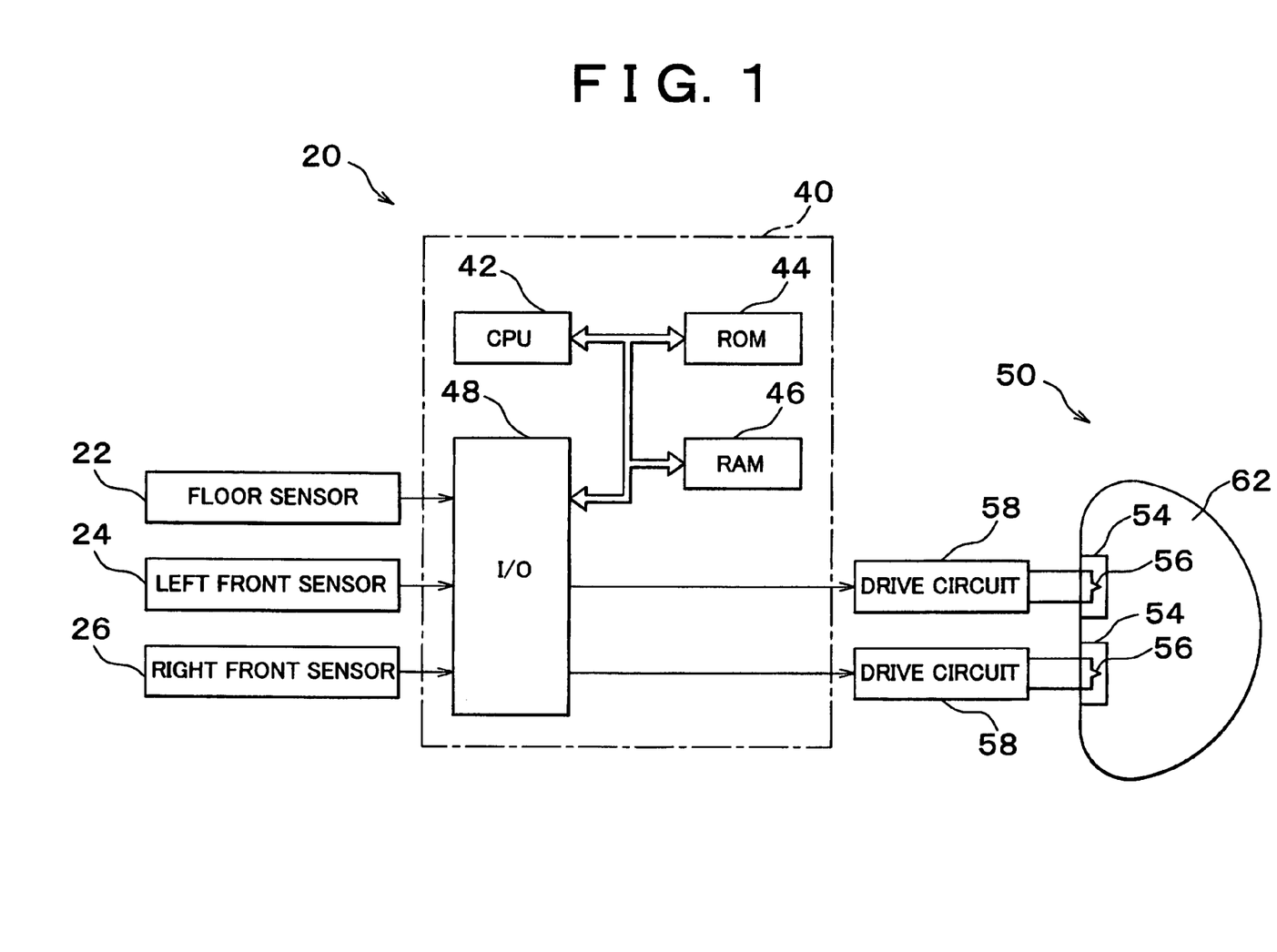
FIG. 1 shows a general hardware structure of the activating device of the occupant protection device according to an embodiment of the invention.

Referring now to a preferable embodiment of the invention with reference to the attached drawings, FIG. 1 is a general hardware structure of the activating device 20 of the occupant protection device according to an embodiment of the invention. In FIG. 1, the occupant protection device to be activated is shown an air bag device 50 as an example.

Figure 2:
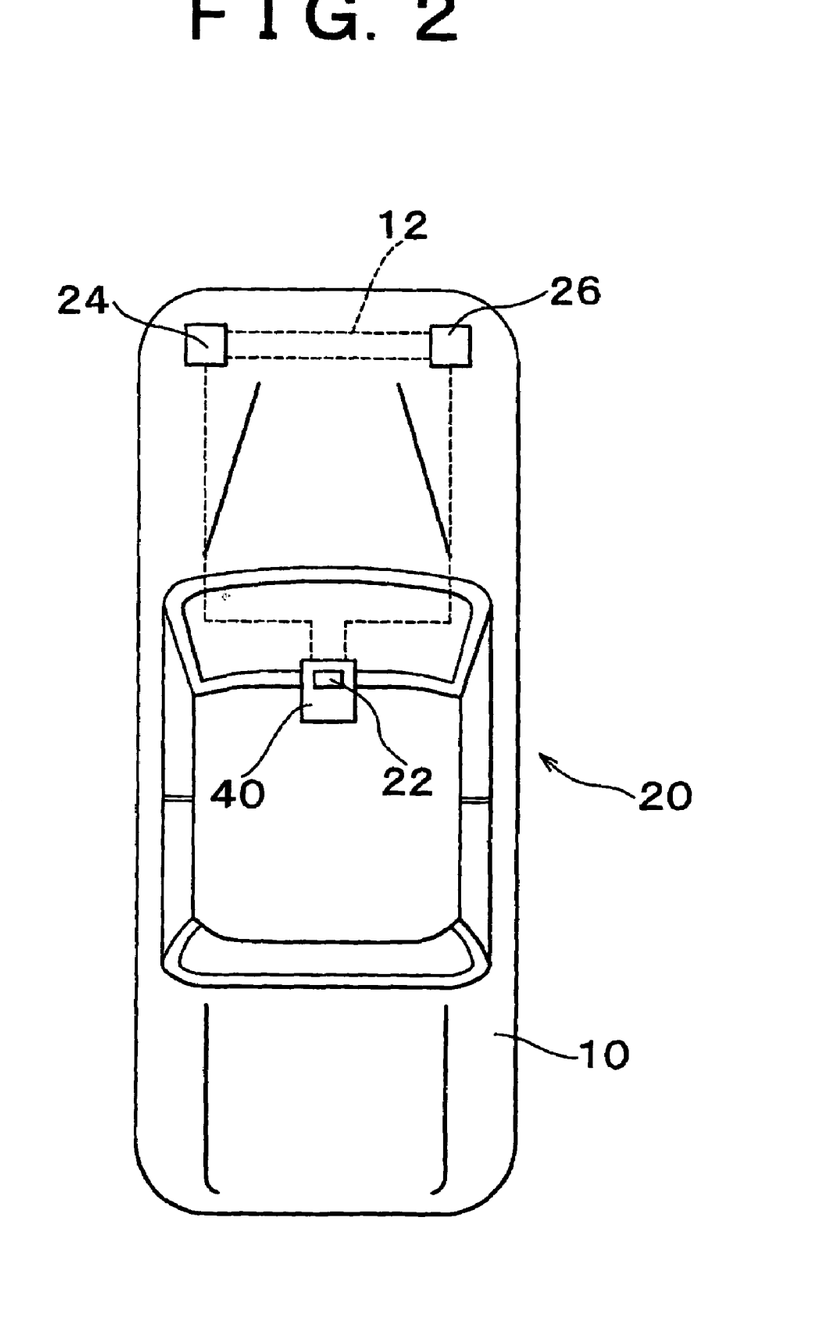
FIG. 2 shows an example condition of the activating device of the occupant protecting device shown in FIG. 1 being installed in a vehicle.
Figure 3:
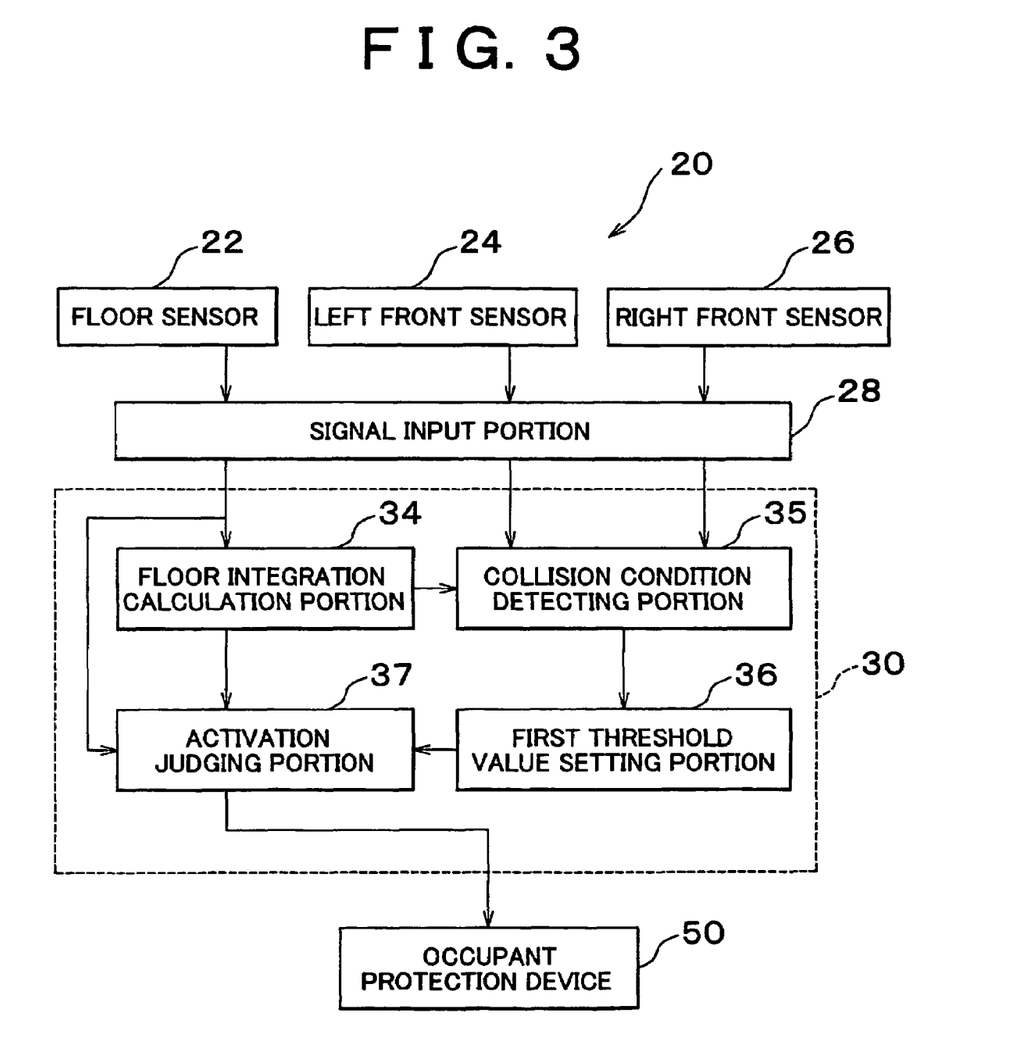
FIG. 3 shows a functional block of the structure of the activating device of the occupant protection device shown in FIG. 1.

FIG. 2 shows an example condition of the activating device 20 being installed in a vehicle 10 and FIG. 3 shows a functional block diagram of the structure of the activating device 20.

As shown in FIGS. 1 and 2, the activating device 20 includes a floor sensor 22 as a first deceleration detecting means and a left front sensor 24 and right front sensor 26 as a second deceleration detecting means. The floor sensor 22 is provided at the vicinity of the central console of the vehicle 10 and detects a vehicle deceleration (floor G, hereinafter) as a first vehicle deceleration speed. The left and right front sensors 24, 26 are attached to left and right support members of a radiator 12 provided at the vehicle front most portion of the vehicle 10, respectively and detect a deceleration speed in vehicle front/rear direction (front LG and front RG, hereinafter) as a second vehicle deceleration.

The front sensors 24, 26 are provided at a portion easy to detect the impact upon vehicle 10 collision. In this embodiment, the left and right front sensors 24, 26 are arranged at the left and right of the radiator 12, but the left and right front sensors 24, 26 may be arranged at the back side of the radiator grill, front side member, apron, suspension tower, lamp side portion or lamp back side. The sensors 24, 26 may be a single front sensor provided at the central portion of the vehicle 10. As a preferable application, according to this embodiment, the front sensor is provided at front left and right sides of the vehicle.

The activating device 20 of the occupant protection device includes a microcomputer 40 which judges the vehicle collision based on the deceleration floor G detected by the floor sensor 22 and the deceleration front LG and front RG detected by the front left and right sensors 24, 26. The microcomputer 40 includes a CPU 42 as a main component and further includes a ROM 44 storing a predetermined processing program, a RAM 46 temporarily storing data and input/output circuit (I/O) 48.

The CPU 42 is set to sample the front left and right sensors 24, 26 with a fixed cycle after a predetermined deceleration floor G is detected by the floor sensor 22. The CPU 42 starts the process judging that a possibility of vehicle collision when the deceleration front LG and RG detected by the front left and right sensors 24, 26 exceeds a predetermined threshold value th. The CPU 42 then detects the vehicle collision based on the deceleration values front LG and RG detected by the front left and right sensors 24, 26. Then the CPU 42, based on the detected result, executes the activating control of the occupant protection device by the deceleration floor G detected by the floor sensor 22. The components of the CPU 42 is clearly shown in the function block of the activating device 20 of the occupant protection device in FIG. 3.

Next, the activating device 20 of the occupant protection device will be explained with reference to the function block view of FIG. 3. The deceleration floor G detected by the floor sensor 22, deceleration front LG and RG detected by the front left and right sensors 24, 26 are supplied to a judging process portion 30 with a predetermined cycle through signal input portion 28.

Figure 4:
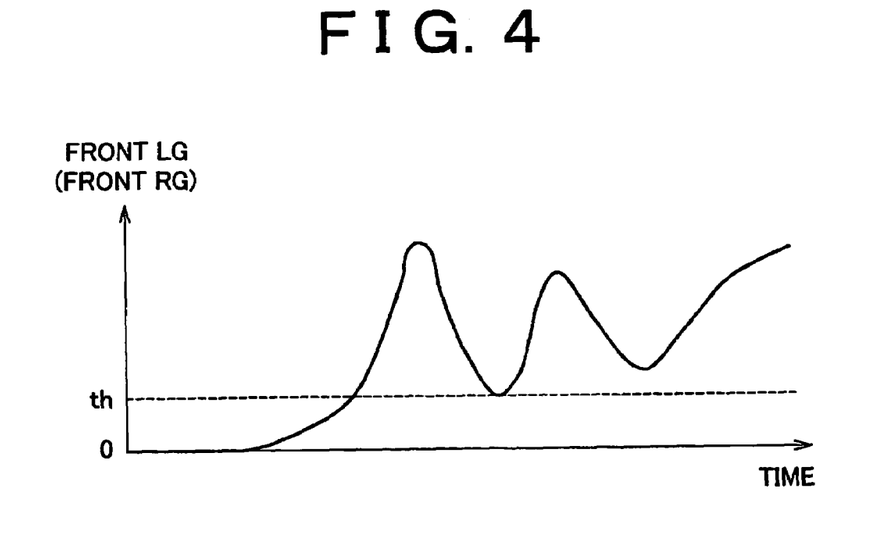
FIG. 4 is a graph showing a predetermined threshold value "th" of deceleration values LG, RG (front left, front right) detected by the front left and right sensors.

The judging process portion 30 is set for preparing process for activating the occupant protection device assuming the vehicle collision when any one of the front LG and RG detected by the front sensors 24, 26 exceeds the predetermined threshold value th as shown in FIG. 4.

The judging process portion 30 includes a floor integral calculation portion 34 as an integral calculating means and an activation judging portion 37 as an activation judging means. The floor integral calculation portion 34 calculates a vehicle deceleration integration value VG as an integration value by the time of deceleration floor G detected by the floor sensor 22 according to the flowing equation (1). The activation judging portion 37 judges the activation of the occupant protection device based on the floor G and the vehicle deceleration integration value VG. The floor integral calculation portion 34 removes the noise included in the floor G by integration process to realize a more accurate activation judgment.

$$VG = \int G(t)dt \quad (1)$$

Figure 5:
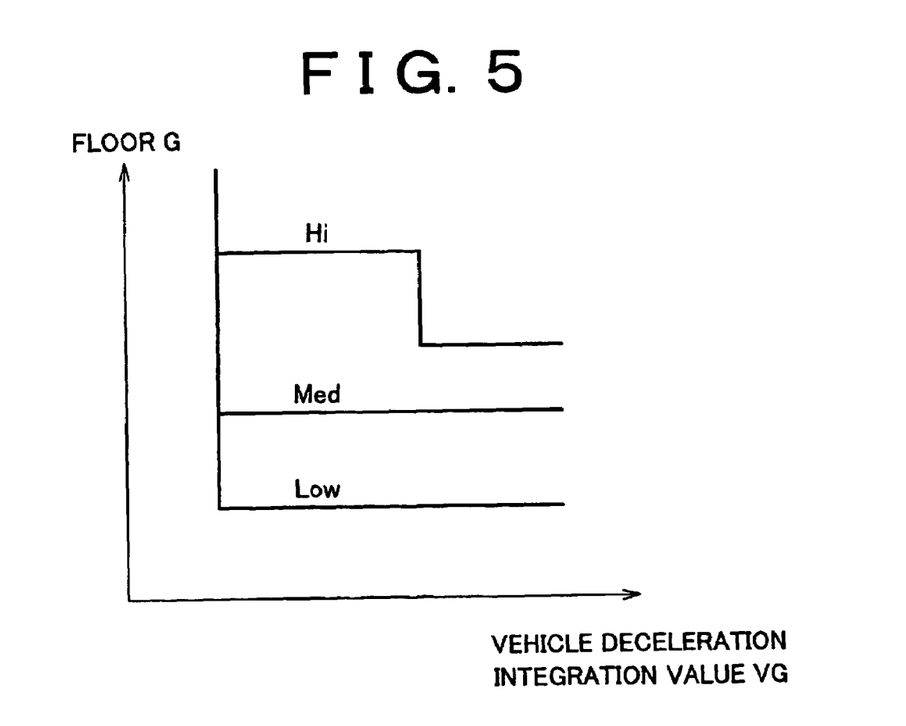
FIG. 5 is an activation judging map of the occupant protection device for judging the activation of the activating device for the occupant protection device.

The activation judging portion 37 includes an activation judging map for activating the occupant protection device in response to the vehicle collision condition showing the floor G as the vertical axis and the vehicle deceleration integration value VG as the horizontal axis as shown in FIG. 5.

In the map, the threshold value (first threshold value) is set which judges whether the occupant protection device is activated or not. It is preferable to set a plurality of threshold values for judging the activation of the occupant protection device. This is because the value of the floor G to decide the activation of the occupant protection device is different according to the vehicle collision conditions. As will be described, one of such threshold values is selected for the activation judgment.

In this embodiment, three threshold values are set for the first threshold value, high value (Hi), intermediate value (Med) and low value (Low). When the floor G, which exceeds these values, is detected, the activation judging portion 37 activates the occupant protection device. Accordingly, the activation judging portion 37 becomes the condition easy to activate the occupant protection device in accordance with the change from the high value (Hi) through the intermediate value (Med) and to the low value (Low).

The three values of the first threshold value are preset for every vehicle based on the data obtained by the collision test and simulations.

As the first threshold value, which one of the three values (Hi), (Med) or (low) is selected is determined by the collision detection result based on the front LG and RG detected by the front sensors 24, 26. This will be explained later in detail.

Figure 6:
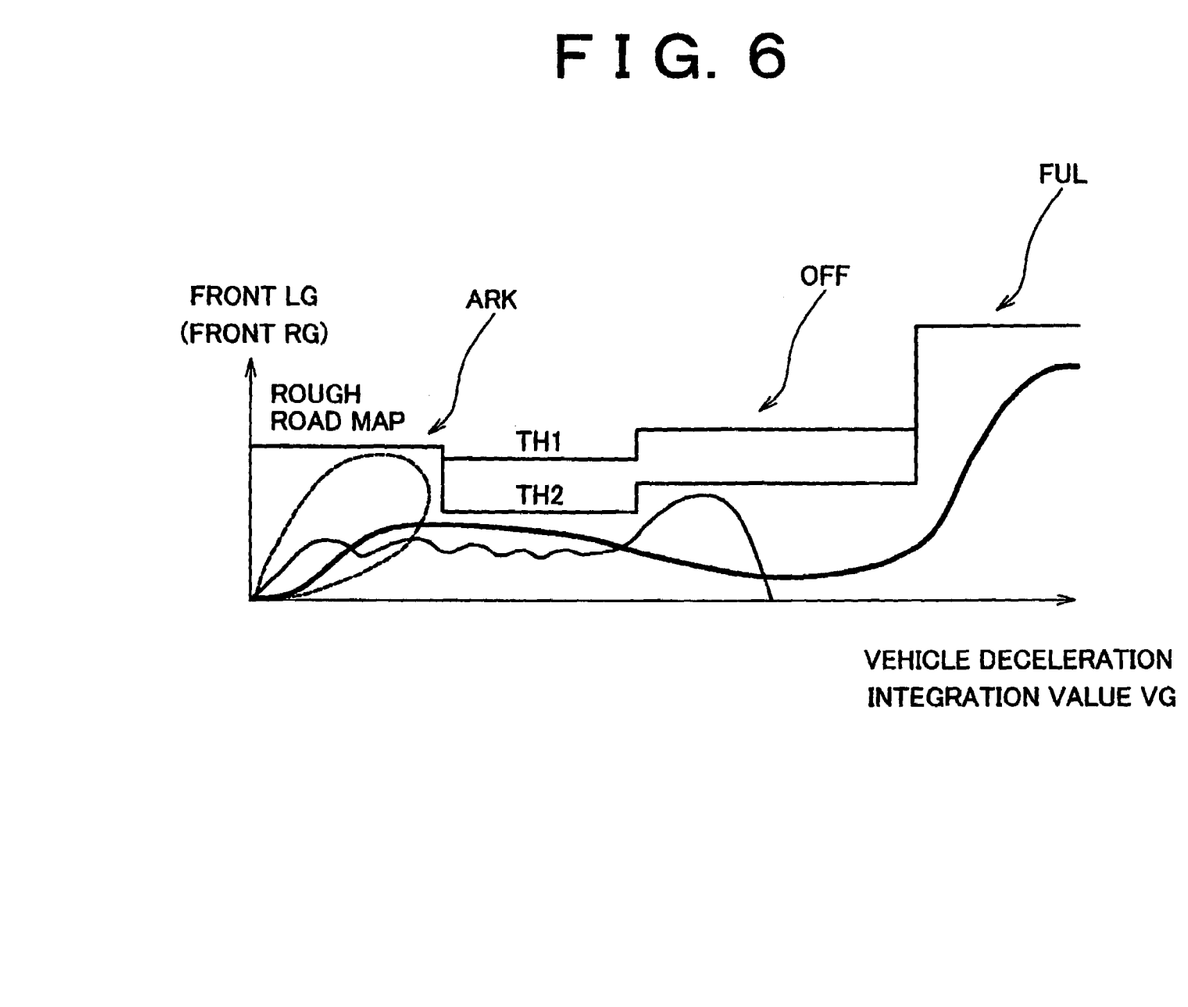
FIG. 6 is an example of a collision condition detecting map for the deceleration of front left LG or right RG.

Further, the judging process portion 30 includes a collision condition detecting portion 35 as a detecting means for detecting the vehicle collision condition by using the front left and right deceleration front LG and RG and the vehicle deceleration integration value VG. The left and right front LG and RG are detected by the front left and right sensors 24, 26, respectively. The vehicle deceleration integration value VG is calculated by the floor integral calculation portion 34. The collision condition detecting portion 35 includes a collision condition detecting map for detecting the collision condition of the vehicle showing front LG or RG as the vertical axis and vehicle deceleration integration value VG as the horizontal axis as shown in FIG. 6.

Alternatively, the vehicle deceleration integration value VG may be formed by integrating the second decelerations RG, LG.

The threshold value (second threshold value TH) for detecting the vehicle collision condition is set. It is preferable to have a plurality of values for the second threshold value. This is because the values of front LG or RG are different according to the vehicle collision conditions. In this embodiment, two threshold values are set, high value (TH1) and low value (TH2).

These values of the second threshold value are preferably preset for every vehicle based on the data obtained by the collision test and simulations.

The collision condition detecting portion 35 detects the vehicle collision condition based on whether any of the front LG or RG detected by the front left and right sensors 24, 26 exceeds the low value (TH2) of the second threshold value and further whether it exceeds the high value (TH1).

Figure 7:
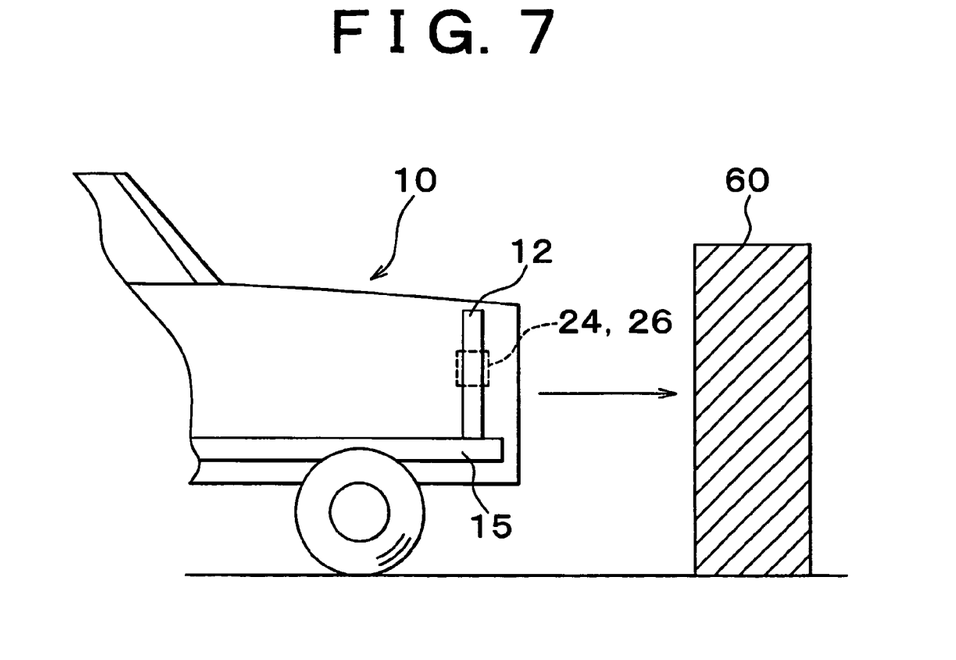
FIG. 7 shows a condition of the front left and right sensors installed in a radiator provided at the vehicle front most portion.

In FIG. 7, the front left and right sensors 24, 26 are provided at the left and right sides of the radiator 12 positioned at the front most portion of the vehicle 10, respectively. The radiator 12 shows the condition of projecting at the front most portion of a frame 15 of the vehicle 10. Since the front left and right sensors 24, 26 are arranged at left and right sides of the radiator 12, if the vehicle collides on a wall 60, the values of front LG and RG are immediately changed. Accordingly, the activating device 20 for the occupant protection device can detect the collision at early stage.

Figure 8:
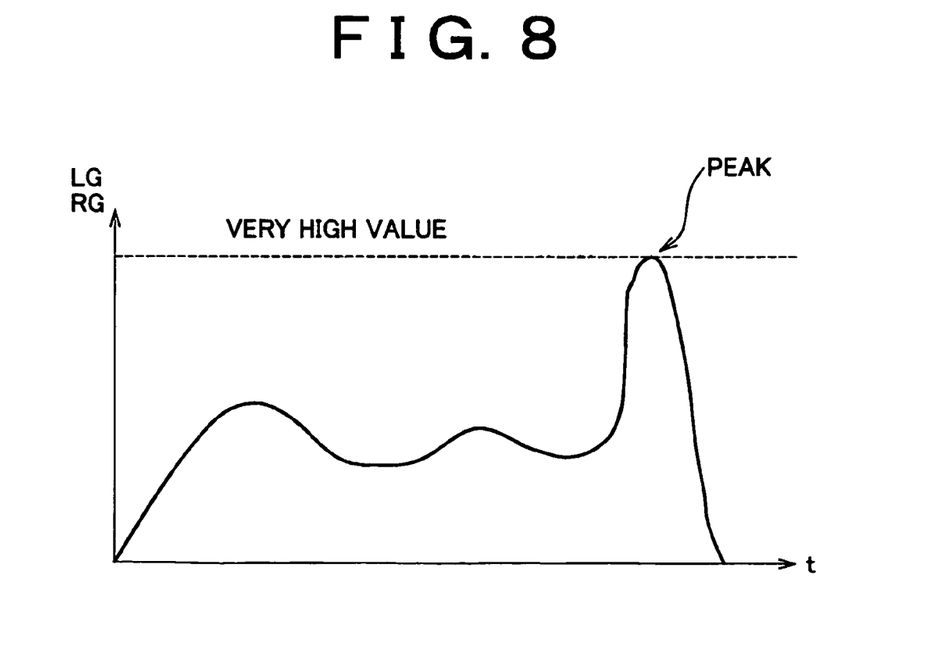
FIG. 8 is a graph showing front left and right decelerations with very large values generated toward the later stage or the end stage of the collision.

However, since the front left and right sensors 24, 26 are arranged at left and right sides of the radiator 12, if the vehicle is running on a rough road, the values of the front LG and RG detected by the front left and right sensors 24, 26 may become large due to the vibration component. Further, if the vehicle collides with a very small damage to the vehicle body not necessary for activating the occupant protection device, the extremely large front LG and RG may be detected as the PEAK at the later stage or the final stage of the collision as shown in FIG. 8. This will be assumed to be generated by the provision of the front left and right sensors 24, 26 at the vehicle front most position. By adding a structure that can securely remove such influence to the activating device 20 for the occupant protection device, more highly accurate collision detection can be achieved by the provision of the front left and right sensors 24, 26 at the vehicle front most position.

Therefore, to remove such extremely large front LG and RG which might occur when the vehicle is running under the rough road or at the later stage of collision, as shown in FIG. 6, the threshold value in the area of front LG and RG that should not be the area for activation judgment for the occupant protection device is increased to prevent the influence therefrom.

In other words, the wave shape showing a sudden increase or decrease immediately after any of the front LG and RG exceeds the predetermined value th indicates the characteristic of the rough road running condition (area enclosed with the dashed line). Accordingly, in order to prevent the erroneous operation of the activating device for the occupant protection device under such rough road running, offset portion ARK is set, which increases the threshold value within this area as shown in FIG. 6.

The wave shape showing with a solid line having a tendency that the front LG or RG once largely increases and then decreases at the later stage of the collision indicates a non-symmetric collision of the vehicle at a low speed. Such collision rather does not damage the vehicle body upon collision and it is not necessary to activate the occupant protection device.

Accordingly, in order to avoid any meaningless large front LG and RG at the later stage of the collision, an offset portion OFF is set.

When the vehicle collides with a low speed, the front LG and RG has a tendency of becoming the wave shape indicated with the bold line and sometimes indicates an extremely large value at the later stage of the collision. Under this case, it is not necessary for activating the occupant protection device. Accordingly, in this case also an offset portion FUL is preferably set to avoid such influence due to the abnormal detection at the later stage of the collision.

Each of such offset portions is preferably set for each vehicle based on the data obtained by the collision test and simulations. Each vehicle is different in strength or structure, the offset portion is selectively determined considering the performance of each vehicle.

As shown in FIG. 6, the collision condition detecting map according to the embodiment includes the structure of provision of the front left and right sensors 24, 26 at the vehicle front most position. The collision condition detecting portion 35 of the occupant protection device can detect the vehicle collision by using the front left and right sensors 24, 26 and the collision condition detecting map accurately and at an early stage of the collision. The collision condition detecting portion 35 judges the possibility of collision necessary for protecting an occupant is high when the front LG and RG of the left and right sensors 24, 26 exceed the low value (TH2) of the second threshold value and judges such possibility is even higher when the front LG and RG exceeds the high value (TH1).

The signal detecting the collision at the collision condition detecting portion 35 is supplied to a first threshold setting portion 36 as shown in FIG. 3. The first threshold setting portion 36 is the first threshold setting means and sets the threshold value to be employed at the activation judging portion 37. The threshold setting signal is supplied to the activation judging portion 37 from the first threshold setting portion 36.

The activation judging map for the occupant protection device used at the activation judging portion 37 is originally set to be the highest value Hi of the first threshold value. The high threshold value Hi is set to be the condition that the activation judgment seldom occurs.

However, this high threshold value is changed to an intermediate value (Med) and further to lower value (Low) by the signal supplied to the activation judging portion 37 from the first threshold setting portion 36. This signal change enables the judgment for activation of the occupant protection device more easily.

According to the above explanation, first a collision condition is detected by the collision detection detected by the front LG and RG based on the collision condition detecting map shown in FIG. 6. At this time, the values TH1 and TH2 are used as a second threshold value to detect how large the collision is. This information is transmitted to the activation judging portion 37 via the first threshold value setting portion 36 to select the optimum first threshold value. Whether the activation of the occupant protection device is necessary or not is judged by the activation judging portion 37 by using the selected first threshold value.

According to the above operation, the optimum first threshold value is decided at the activation judging portion 37 and then the activation judgment is made. This will realize more preferable judgment.

In the collision condition detecting map illustrated in FIG. 6, the vehicle collision condition is detected by validating the two threshold values, high value (TH1) and low value (TH2). In the activation judging map for the occupant protection device illustrated in FIG. 5, the activation judgment is made by selecting any one of the first threshold values, high value (Hi), intermediate value (Med) and low value (Low).

When the vehicle strength is symmetrical between the left and right sides of the vehicle, one collision condition detecting map in FIG. 6 may be used for both left and right sides, but generally the vehicle strength is different between the left and right sides and two maps for front LG and RG may be individually prepared for detecting the collision condition.

As mentioned above, as an occupant protection device, the air bag device 50 is shown in FIG. 1. This air bag device 50 will be briefly explained. The air bag device 50 includes an air bag 52, two inflators 54, ignition device 56 and two drive circuits 58. The inflators 54 supply gas to the air bag 52. The ignition device 56 ignites a gas generation agent (not shown). The drive circuits 58 supply current to the ignition device 56 based on the drive signal from the microcomputer 40.

The purpose of providing two inflators is that one inflator inflates the air bag 52 with a high expansion speed (high expansion) and the other inflator inflates the air bag 52 with the time differential (low expansion).

The selection of either the high expansion or the low expansion is set in accordance with the vehicle collision type.

Figure 9:
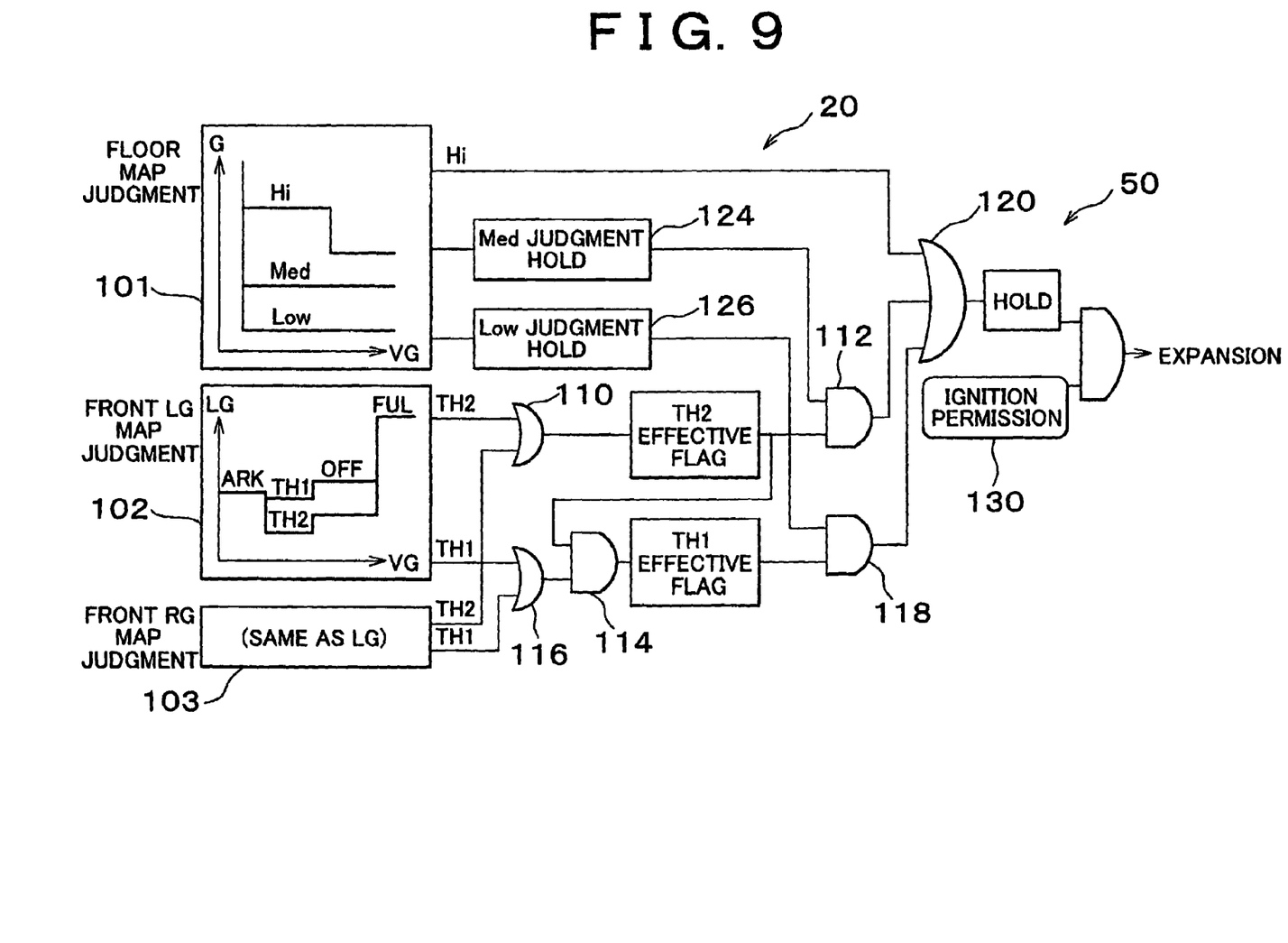
FIG. 9 is a circuit structure of the activating device of the occupant protection device.

FIG. 9 shows the circuit structure of the operation of the activating device 20 of the occupant protection device. The operation of the activating device 20 will be explained with reference to FIG. 9.

The value front LG or RG becomes the judgment subject by the collision condition detecting map 102 or 103 when the value exceeds the predetermined threshold value th. When the value front LG or RG is detected by the map 102 or 103 to exceed the low value (TH2) of the second threshold value, the signal is supplied to the gate 110. When the value front LG or RG is detected by the map 102 or 103 to exceed the high value (TH1) of the second threshold value, the signal is supplied to the gate 116.

If the detected value is different between the front LG and RG, any of the signal corresponding to the value, which exceeds the higher value, is employed.

This circuit includes a gate 114 to precondition that the high value TH1 flag becomes effective only when the detected value exceeds the low value (TH2). This will improve the reliability of the detection.

When the collision is detected at the collision condition detecting map 102 or 103, any one of the first threshold values, Hi, Med and Low is selected at the activation judging map 101. The high value Hi of the first threshold values is initially set for the activation judging map 101. When both front LG and RG do not exceed the low value (TH2) of the second threshold value, this first threshold value is selected to execute the activation judgment for the occupant protection device.

Thereafter, the activation judgment signal is supplied to the air bag 50 via the gate 120 to execute the air bag expansion by receiving the ignition permission 130.

Next, when at least one of the front LG and RG exceeds the low value (TH2) as the second threshold value at the collision condition detecting maps 102 and 103, the intermediate value (Med) as the first threshold value is selected at the activation judging map for activation of the occupant protection device. In this case, the flag validating the low value (TH2) as the second threshold value is supplied from the collision condition detecting map 102, 103 side via the gate 110 and the signal is supplied to the gate 112. On the other hand, at the activation judging map 101, the activation judgment is executed using the intermediate value (Med) as the first threshold value. When the floor G exceeds the intermediate value (Med), the activating signal is supplied and after holding a predetermined time at the Med judgment hold circuit 124, the activating signal is supplied to the gate 112. The holding at the Med judgment hold circuit 124 is set to avoid the time differential between the floor sensor 22 side and front sensors 24, 26.

Then the activation judgment signal is supplied to the air bag 50 via the gate 120 to execute the air bag expansion by receiving the ignition permission 130.

When at least one of the front LG and RG exceeds the high value (TH1) as the second threshold value at the collision condition detecting maps 102 and 103, the low value (Low) as the first threshold value is selected at the activation judging map for activation of the occupant protection device. In this case, the flag validating the high value (TH1) as the second threshold value is supplied from the collision condition detecting map 102, 103 side via the gate 116 and the signal is supplied to the gate 118. It is confirmed that the signal exceeds the low value (TH2) at the gate 114. On the other hand, at the activation judging map 101, the activation judgment is executed using the low value (Low) as the first threshold value. When the floor G exceeds the low value (Low) the activating signal is supplied and after holding a predetermined time at the Low judgment hold circuit 126, the activating signal is supplied to the gate 118. The holding at the Low judgment hold circuit 126 is set to avoid the time differential between the floor sensor 22 side and front sensors 24, 26.

Then the activation judgment signal is supplied to the air bag 50 via the gate 120 to execute the air bag expansion by receiving the ignition permission 130.

As described, according to the activating device 20 for the occupant protection device, as the second deceleration detecting means, the front left and right sensors 24, 26 are arranged at the vehicle front most position where the impact of the vehicle collision is highly sensible. Accordingly, by using the first threshold value changed by the detected result, the activation judgment is executed to accurately activate the occupant protection device.

Further, in the activating device 20 of the occupant protection device a noise component can be removed by using the vehicle deceleration integration value VG which is the integration of the vehicle deceleration by the time. According to the activation judging map 101 for the occupant protection device, the activation judgment can be accurately made. The offset portions ARK, OFF and FUL are provided in the collision condition detecting maps 102, 103 to detect the vehicle collision condition accurately. After selecting the optimum first threshold value based on the detected results, the activation judgment is executed for the occupant protection device. This can prevent the erroneous activation judgment that would be made under a small collision not necessary for activating the air bag device and also prevents an early or late activation timing.

In the embodiment above, the activating device for the air bag device 50 is shown but it can be used for the pretensioning device for winding a seat belt as an occupant protection device. Further, the circuit shown in FIG. 9 can be arranged in parallel to activate simultaneously the pre-tensioning device and the air bag device.

Having explained a preferred embodiment of the invention, the invention is not limited to this embodiment and it is possible to change or improve thereof within the scope of the invention defined by the attached claims.

What is claimed is:

1. An activating device for an occupant protection device comprising:
    a first deceleration detecting means for detecting a first deceleration which is the deceleration in a front/rear direction of a vehicle;
    an activation judging means for judging the activation of the occupant protection device by comparing the first deceleration with a predetermined first threshold value;
    a second deceleration detecting means for detecting a second deceleration which is the deceleration in the front/rear direction of the vehicle, the second deceleration detecting means being arranged further forward in the vehicle than the first deceleration detecting means;
    a collision condition detecting means for detecting a collision condition of the vehicle by using the second deceleration; and
    a first threshold value setting means for setting the first threshold value of the activation judging means for judging the activation of the occupant protection device based on the condition detected by the collision condition detecting means,
    wherein said collision condition detecting means includes a collision condition detecting map for detecting a vehicle collision condition by comparing the second deceleration with a predetermined second threshold value which is set on said map beforehand such that the second threshold value changes so as to form a predetermined pattern, and
    wherein the collision condition detecting map is formed by the second deceleration and a second deceleration integration value, wherein the collision condition detecting means judges the possibility of collision if the second deceleration integration value exceeds the second threshold value.

2. An activating device according to claim 1, wherein the higher the second deceleration is relative to the second threshold value, the lower the first threshold value of the setting means is set.

3. An activating device according to claim 1, wherein the activation device further includes an integral calculating means for integrating the first deceleration by the time to calculate a first deceleration integration value; and
    the activation judging means includes an activation judging map formed by the first deceleration and the first deceleration integration value to set the first threshold value on the activation judging map, wherein the activation judgment activates the activating device if the first deceleration exceeds the first threshold value.

4. An activating device according to claim 1, wherein the second threshold value is increased beyond the reference value to avoid a wave shape which is not the subject of collision condition detection at an intermediate stage of the vehicle collision.

5. An activating device according to claim 1, wherein the second threshold value is increased beyond the reference value to avoid a wave shape which is not the subject of collision condition detection at an end stage of the vehicle condition.

6. An activating device according to claim 1, wherein plural sets of second threshold values are provided.

7. An activating device according to claim 1, wherein the first threshold value is selected from predetermined plural number of values.

8. An activating device according to claim 1, wherein the second deceleration detecting means is provided at left and right sides of the vehicle.

9. An activating device according to claim 1, wherein the occupant protection device is an air bag device.

10. An activating device according to claim 1, wherein the

11. An activating device for an occupant protection device comprising:
    a first deceleration detecting means for detecting a first deceleration which is the deceleration in a front/rear direction of a vehicle;
    an activation judging means for judging the activation of the occupant protection device by comparing the first deceleration with a predetermined first threshold value;
    a second deceleration detecting means for detecting a second deceleration which is the deceleration in the front/rear direction of the vehicle, the second deceleration detecting means being arranged further forward in the vehicle than the first deceleration detecting means;
    a collision condition detecting means for detecting a collision condition of the vehicle by using the second deceleration; and
    a first threshold value setting means for setting the first threshold value of the activation judging means for judging the activation of the occupant protection device based on the condition detected by the collision condition detecting means,
    wherein said collision condition detecting means includes a collision condition detecting map for detecting a vehicle collision condition by comparing the second deceleration with a predetermined second threshold value which is set on said map beforehand such that the second threshold value changes so as to form a predetermined pattern,
    wherein the second threshold value is increased beyond a reference value to avoid a wave shape which is not the subject of collision condition detection at an early stage of the vehicle collision.

12. An activating device for an occupant protection device comprising:
    a first deceleration detecting means for detecting a first deceleration which is the deceleration in a front/rear direction of a vehicle;
    an activation judging means for judging the activation of the occupant protection device by comparing the first deceleration with a predetermined first threshold value;
    a second deceleration detecting means for detecting a second deceleration which is the deceleration on the front/rear direction of the vehicle, the second deceleration detecting means being arranged further forward in the vehicle than the first deceleration detecting means;
    a collision condition detecting means for detecting a collision condition of the vehicle by using the second deceleration; and
    a first threshold value setting means for setting the first threshold value of the activation judging means for judging the activation of the occupant protection device based on the condition detected by the collision condition detecting means,
    wherein said collision condition detecting means includes a collision condition detecting map for detecting a vehicle collision condition by comparing the second deceleration with a predetermined second threshold value which is set on said map beforehand such taht the second threshold value changes so as to form a predetermined pattern,
   wherein the first threshold value is selected from pretermined plural number of values, and
   wherein as an initial value for the first threshold value, the highest threshold value is set.

13. An activating device according to claim 12, wherein the first threshold value is changed from the initial value in accordance with the condition detected by the collision condition detecting means.

14. An activating device according to claim 13, wherein the first threshold value is set according to one of three values having the following relation:
   first 1a threshold value>first 1b threshold value>first 1c threshold value, and the second threshold value is set to two values having the following relation:
   second 2a threshold value>second 2b threshold value, wherein when the second deceleration is less than the second 2b threshold value, the first threshold value is defined to be the first 1a threshold value, when the second deceleration is equal to or more than the second 2b threshold value and less than the second 2a threshold value, the first threshold value is defined to be the first 1b threshold value, and when the second deceleration is equal to or more than the second 2a threshold value, the first threshold value is defined to be the first 1c threshold value. occupant protection device is a pre-tensioning device for a seat belt.

15. A method for controlling an activating device for an occupant protection device comprising the steps of:
   detecting a first deceleration which is the deceleration in a front/rear direction of a vehicle;
   judging the activation of the occupant protection device by comparing the first deceleration with a predetermined first threshold value;
   detecting a second deceleration which is the deceleration in the front/rear direction of the vehicle and which is detected at a position further forward in the vehicle than the position where the first deceleration is detected;
   detecting a collision condition of the vehicle by using the second deceleration; and
   setting the first threshold value used for judging the activation of the occupant protection device based on the detected vehicle collision condition, wherein
   the vehicle collision condition is detected by comparing the second deceleration with a predetermined second threshold value which is set on a collision condition detecting map beforehand such that the second threshold value changes so as to form a predetermined pattern,
   wherein the collision condition detecting map is formed by the second deceleration and a second deceleration integration value, wherein the possibility of collision is judged if the second deceleration integration value exceeds the second threshold value.

16. A method according to claim 15, wherein the higher the second deceleration relative to the second threshold value is, the lower the first threshold value of the setting means is set.

17. A method for controlling an activating device according to claim 15, wherein the method includes setting the first threshold value on an activation judging map formed by the first deceleration and the first deceleration integration value integrating the first deceleration by the time, wherein the activation judgment activates the activating device if the first deceleration exceeds the first threshold value.

18. A method for controlling an activating device according to claim 15, wherein plural sets of second threshold values are provided.

19. A method for controlling an activating device according to claim 15, wherein the first threshold value is selected from predetermined plural numbers of values.

20. A method for controlling an activating device according to claim 15, wherein the second deceleration is detected at left and right sides of the vehicle.

21. A method for controlling an activating device according to claim 15, wherein the occupant protection device is an air bag device.

22. A method for controlling an activating device according to claim 15, wherein the occupant protection device is a pre-tensioning device for a seat belt.

23. A method for controlling an activating device for an occupant protection device comprising the steps of:
   detecting a first deceleration which is the deceleration in a front/rear direction of a vehicle;
   judging the activation of the occupant protection device by comparing the first deceleration with a predetermined first threshold value;
   detecting a second deceleration which is the deceleration in the front/rear direction of the vehicle and which is detected at a position further forward in the vehicle than the position where the first deceleration is detected;
   detecting a collision condition of the vehicle by using the second deceleration;
   setting the first threshold value used for judging the activation of the occupant protection device based on the detected vehicle collision condition, wherein
   the vehicle collision condition is detected by comparing the second deceleration with a predetermined second threshold value which is set on a collision condition detecting map beforehand such taht the second threshold value changes so as to form a predetermined pattern,
   wherein the collision condition detecting map formed by the second deceleration and a second deceleration integration value, wherein the possibility of collision is judged if the second deceleration integration value exceeds the second threshold value,
   wherein the second threshold value is increased beyond a reference value to avoid a wave shape which is not the subject of collision condition detection at an early stage of the vehicle collision.

24. A method for controlling an activating device for an occupant protection device comprising the steps of:
   detecting a first deceleration which is the deceleration in a front/rear direction of a vehicle;
   judging the activation of the occupant protection device by comparing the first deceleration with a predetermined first threshold value;
   detecting a second deceleration which is the deceleration in the front/rear direction of the vehicle and which is detected at a position further forward in the vehicle than the position where the first deceleration is detected;
   detecting a collision condition of the vehicle by using the second deceleration;
   setting the first threshold value used for judging the activation of the occupant protection device based on the detected vehicle collision condition, wherein the vehicle collision condition is detected by comparing the second deceleration with a predetermined second threshold value which is set on a collision condition detecting map beforehand such that the second threshold value changes so as to form a predetermined pattern, wherein the collision condition detecting map is formed by the second deceleration and a second deceleration integration value, wherein the possibility of collision is judged if the second deceleration integration value exceeds the second threshold value, wherein the second threshold value is increased beyond the reference value to avoid a wave shape which is not the subject of collision condition detection at an intermediate stage of the vehicle collision.

25. A method for controlling an activating device for an occupant protection device comprising the steps of:

detecting a first deceleration which is the deceleration in a front/rear direction of a vehicle;

judging the activation of the occupant protection device by comparing the first deceleration with a predetermined first threshold value;

detecting a second deceleration which is the deceleration in the front/rear direction of the vehicle and which is detected at a position further forward in the vehicle than the position where the first deceleration is detected:

detecting a collision condition of the vehicle by using the second deceleration;

setting the first threshold value used for judging the activation of the occupant protection device based on thr detected vehicle collison condition, wherein the vehicle collision condition is detected by comparing the second deceleration with a predetermined second threshold value which is set on a collision condition detecting map beforehand such that the second threshold value changes so as to form a predetermined pattern, wherein collision condition detecting map is formed by the second deceleration and a second deceleration integration value, wherein the possibility of collision is judged if the second deceleration integration value exceeds the second threshold value, wherein the second threshold value is increased beyond the reference value to avoid a wave shape which is not the subject of collision condition detection at an end stage of the vehicle collision.

26. A method for controlling an activating device for an occupant protection device comprising the steps of:

detecting a first deceleration which is the deceleration in a front/rear direction of a vehicle;

judging the activation of the occupant protection device by comparing the first deceleration with a predetermined first threshold value;

detecting a second deceleration which is the deceleration in the front/rear direction of the vehicle and which is detected at a position further forward in the vehicle than the position where the first deceleration is detected;

detecting a collision condition of the vehicle by using the second deceleration; and setting the first threshold value used for judging the activation of the occupant protection device based on the detected vehicle collision condition, wherein the vehicle collision condition is detected by comparing the second deceleration with a predetermined second threshold value which is set on a collision condition detecting map beforehand such that the second threshold value changes so as to form a predetermined pattern, wherein the first threshold value is selected from predetermined plural numbers of values, wherein as an initial value for the first threshold value, the highest threshold value is set.

27. A method for controlling an activating device according to claim 26, wherein the first threshold value is changed from the initial value in accordance with the collision condition of the vehicle.

28. A method for controlling an activating device according to claim 27, wherein the first threshold value is set according to one of three values having the following relation:

first $1a$ threshold value>first $1b$ threshold value>first $1c$ threshold value, and the second threshold value is set to two values having the following relation:

second $2a$ threshold value>second $2b$ threshold value, wherein when the second deceleration is less than the second $2b$ threshold value, the first threshold value is defined to be the first $1a$ threshold value, when the second deceleration is equal to or more than the second $2b$ threshold value and less than the second $2a$ threshold value, the first threshold value is defined to be the first $1b$ threshold value, and when the second deceleration is equal to or more than the second $2a$ threshold value, the first threshold value is defined to be the first $1c$ threshold value.

* * * * *

UNITED STATES PATENT AND TRADEMARK OFFICE
CERTIFICATE OF CORRECTION

PATENT NO. : 7,243,944 B2  
APPLICATION NO. : 10/476659  
DATED : July 17, 2007  
INVENTOR(S) : Katsuji Imai et al.

It is certified that error appears in the above-identified patent and that said Letters Patent is hereby corrected as shown below:

| Column | Line | |
|---|---|---|
| 10 | 11 | After "wherein the" insert --occupant protection device is a pre-tensioning device for a seat belt.--. |
| 10 | 57 | Change "on the" to --in the--. |
| 11 | 2 | Change "such that" to --such that--. |
| 11 | 29-30 | After "value." delete "occupant protection device is a pre-tensioning device for a seat belt.". |
| 12 | 39 | Change "such taht" to --such that--. |
| 13 | 32 | Change "thr detected" to --the detected--. |

Signed and Sealed this

Twenty-ninth Day of April, 2008

JON W. DUDAS  
*Director of the United States Patent and Trademark Office*